Jan. 10, 1956    J. H. McGINN    2,730,008
OPTICAL MICROMETER

Filed June 30, 1954    3 Sheets-Sheet 1

INVENTOR
JOHN H. McGINN

BY Harold T. Stowell
ATTORNEY

Jan. 10, 1956    J. H. McGINN    2,730,008
OPTICAL MICROMETER
Filed June 30, 1954    3 Sheets-Sheet 2
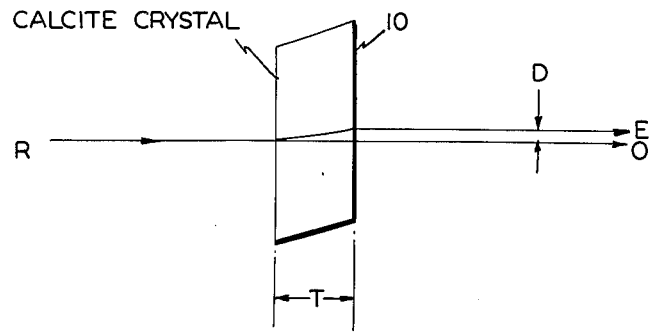
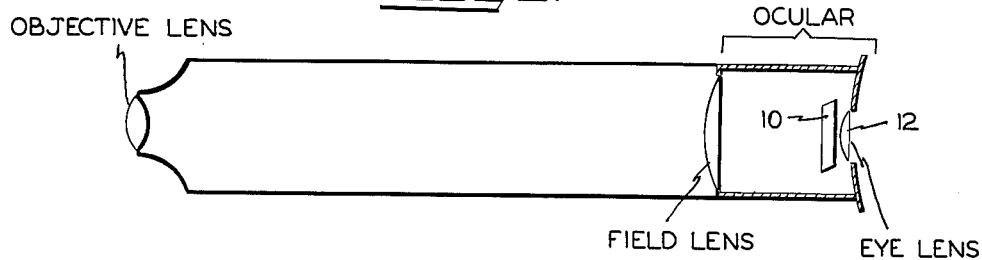
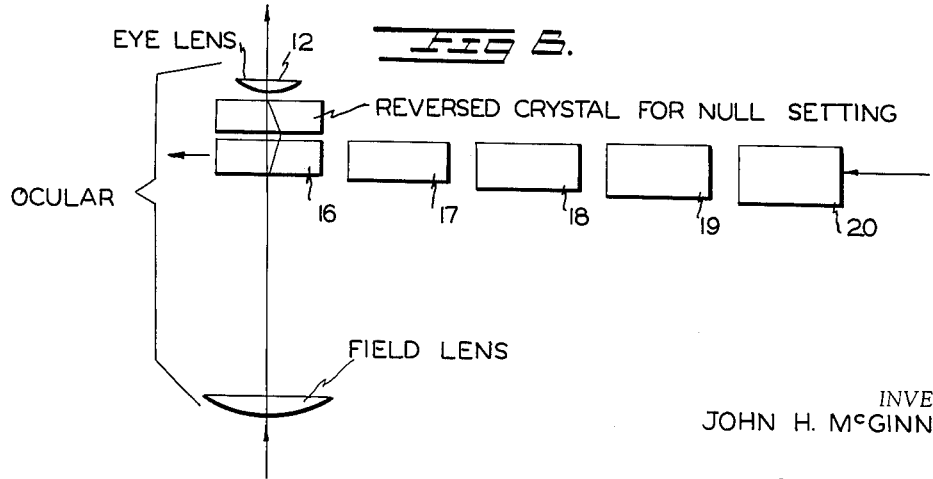
INVENTOR
JOHN H. McGINN
BY Harold T. Stowell
ATTORNEY Jan. 10, 1956  J. H. McGINN  2,730,008
OPTICAL MICROMETER
Filed June 30, 1954  3 Sheets-Sheet 3
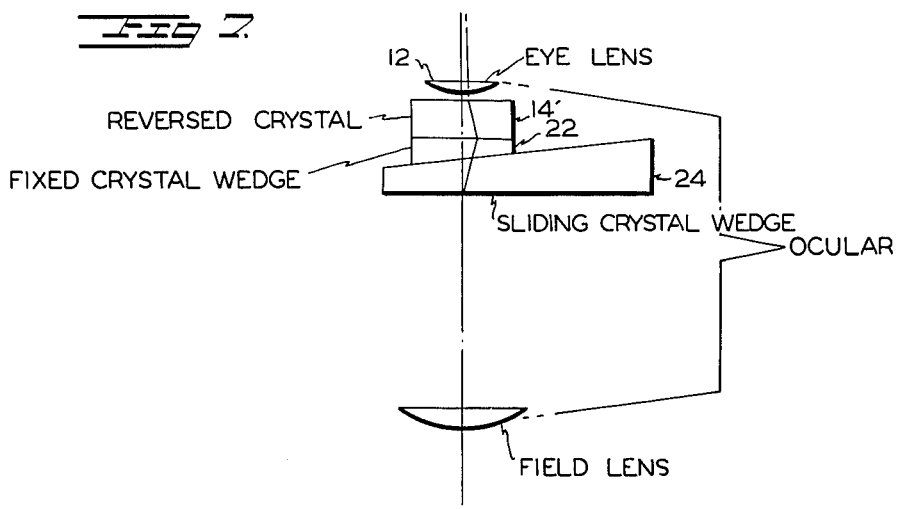
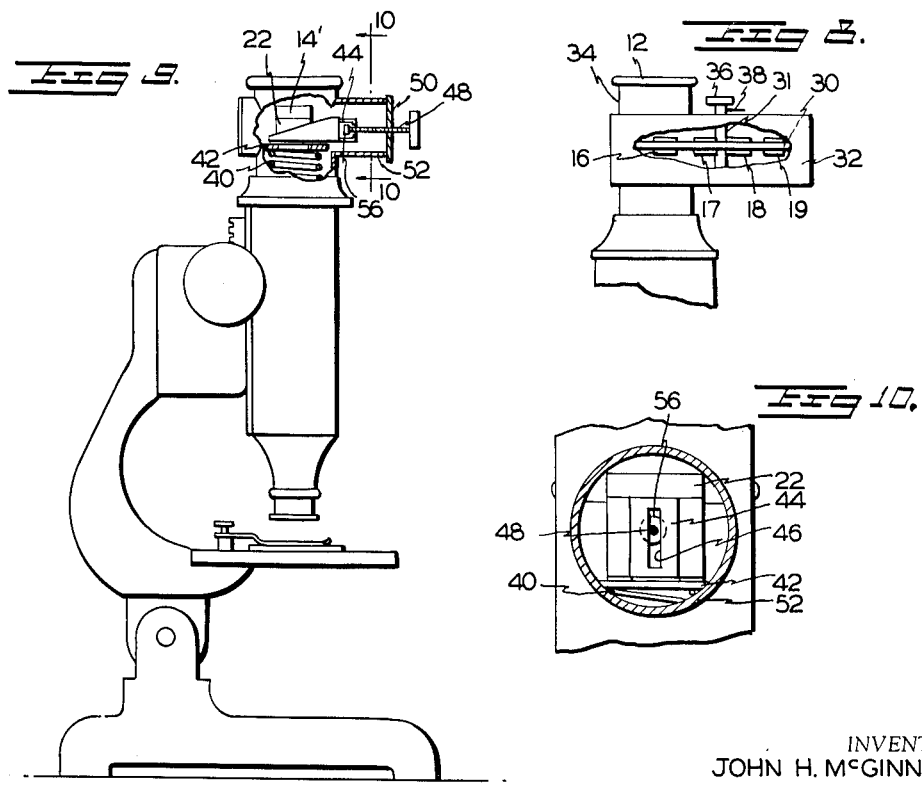
INVENTOR
JOHN H. McGINN
BY Harold T. Stowell
ATTORNEY United States Patent Office 2,730,008
Patented Jan. 10, 1956

2,730,008

OPTICAL MICROMETER

John H. McGinn, Philadelphia, Pa., assignor, by mesne assignments, to Research Corporation, New York, N. Y., a nonprofit corporation of New York Application June 30, 1954, Serial No. 440,394

5 Claims. (Cl. 88—14)

This invention relates to apparatus for measuring the size, and, particularly, the size-frequency distribution of a plurality of discrete microscopic objects in a field.

Present methods for measuring the size of microscopic objects involve the use of such auxiliary equipment and techniques as the ocular micrometer, various forms of graticules, the camera lucida, etc. For very small particles, say in the neighborhood of two or three microns, these methods are extremely fatiguing and subject to considerable error. This is particularly true if dark-field illumination is used. Furthermore, if one is interested in classifying a great number of particles according to size, the above methods are inherently time consuming, since a reference line or fiduciary mark must be positioned and a scale read for every item measured.

It is a primary object of the present invention to provide apparatus which greatly simplifies the measurement of the size-frequency distribution of microscopic objects, and by means of which all objects within any one definite size range may be readily identified in a field of objects of various sizes.

A further object is to provide a simple device for enabling a rapid count to be made of all objects of a predetermined size range and which is adjustable for rapidly switching from one size range to another whereby the number of particles in each size range may be counted.

The specific nature of the invention, as well as other objects and advantages thereof, will clearly appear from a description of a preferred embodiment as shown in the accompanying drawing, in which:

Fig. 4 is a diagram illustrating the principle of birefringence;

Fig. 5 is a schematic diagram of a microscope showing the manner in which the birefringent crystal may be employed;

Fig. 6 is a schematic diagram showing the manner in which a series of graded crystals may be employed;

Fig. 7 illustrates the use of a sliding crystal wedge for adjusting the apparent field separation;

Fig. 8 is a view of the eye piece portion of a microscope embodying the arrangement of Fig. 6;

Fig. 9 is a side view of a microscope, partly in section, embodying the sliding crystal wedge arrangement of Fig. 7; and Fig. 10 is a view taken on line 10—10 of Fig. 9.

Figure 1:
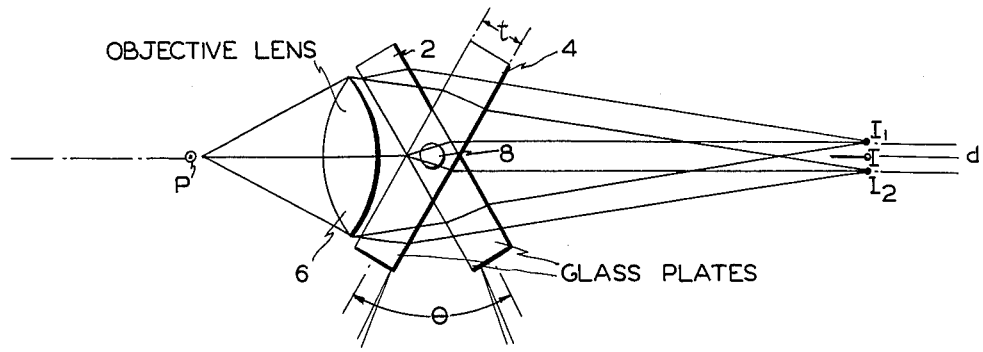
Figs. 1 and 2 are schematic diagrams taken at right angles to each other illustrating the principle of the invention.
Figure 2:
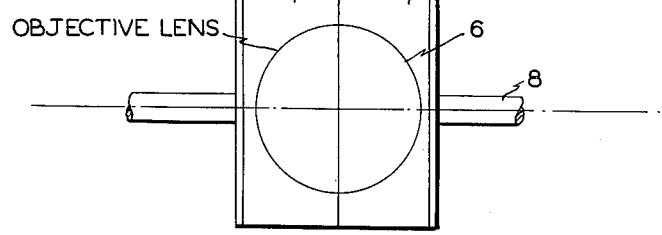

Referring to Figs. 1 and 2, which illustrate the principle of the invention, a split objective effect is produced by placing two glass plates 2 and 4 immediately behind the objective lens 6 of a microscope, each plate covering one-half of the lens area as indicated in Fig. 2. When both plates are in the same plane a single image of the point P (see Fig. 1) is formed at I. If the plates are now rotated about their common axis 8 in equal and opposite directions through the included angle $\theta$, two images of P will be formed, one at $I_1$ and the second at $I_2$. Each image is formed by one half of the lens. For small angles (less than 10°) the displacement, $d$, of the two images is given by the following expression:

$$d = (1 - 1/\eta) t \theta$$

where $\eta$ = the relative index of refraction of the glass plates
$t$ = thickness of the plates
$\theta$ = the included angle between the plates (in radians)

The same displacement could have been caused by actually moving the object a distance $\delta = d/M_0$, where $M_0$ equals the magnification of the objective. From this it follows that a rotation of the plates results in an apparent displacement of the object by an amount $$\delta = \frac{(1 - 1/n)}{M_0} t \theta$$

This particular arrangement, while it is entirely operative, has certain drawbacks. The two main objections are: (a) the eye must be centered exactly on the optic axis of the microscope if both images ($I_1$ and $I_2$) are to appear equally as bright; and (b), the location of the plates presents an awkward mechanical problem. An arrangement which obviates these drawbacks is shown below.

Figure 3:
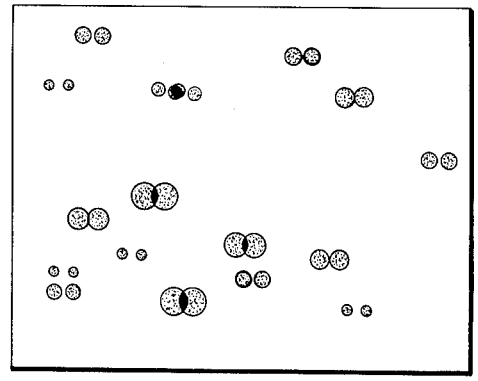
Fig. 3 represents a typical overlapping field of view as seen with the double image micrometer of the invention.

Fig. 3 is drawn from a photomicrograph of droplets illustrating the double image effect. The dimension of an object is measured along any axis by displacing its two images until they are tangent. The magnitude of this displacement corresponds to the dimension in question, and may be read directly from a calibrated dial. Simultaneously, all other objects having the same dimension will also produce tangent images. Thus, by scanning the field of view for tangent images, one can count all those objects of a given size without making any additional adjustments. In effect, every object in the field is compared with itself, each acting as its own yardstick.

A second and highly satisfactory arrangement makes use of the double refracting properties of certain crystals. Consider a ray of light R (see Fig. 4) which impinges upon the surface of a calcite (Iceland spar) crystal 10 at normal incidence. The ray will be split into two parts, generally called the ordinary (O) ray and the extraordinary (E) ray. These two rays will emerge from the crystal parallel to each other but displaced a distance "D," as indicated in Fig. 4. The magnitude of the displacement is proportional to the thickness "T," i. e., $$D \text{ (in microns)} = 1093\ T \text{ (in cm.)}$$

By incorporating such an element into the optical system of the microscope, one can obtain the desired double image. While the crystal may be placed practically anywhere in the system, in general the ocular is the most convenient location. If the crystal 10 is mounted just in front of the eye lens 12 (see Fig. 5) a double image will be seen. The apparent separation, $\Delta$, is approximately $$\Delta \text{ (in microns)} = \frac{1093\ T}{M_0 M_F}$$

Where $T$ = the thickness of the calcite crystal in cm.
$M_0$ = the magnification of the objective
$M_F$ = the magnification of the field lens of the ocular For example, with a 10x objective and a 10x Huygen's eye-piece, $M_0 = 10$ and $M_F$ 0.7. Thus a crystal 0.13 cm. thick produces a double image with an apparent separation of $$=\frac{1093 \times .13}{10 \times .7}=20 \text{ microns}$$

This means the image pairs for every 20 micron particle in the field of view will appear to be tangent.

The separation of the images can be varied in a stepwise manner by using a series of birefringent crystals 16—20, graded in thickness and mounted on a suitable rotating frame as shown in Fig. 8. A null displacement can be obtained by inserting a reversed crystal 14'.

A sliding wedge arrangement (Fig. 7) may be used if a continuous variation in displacement is desired.

In this case, the reversed crystal 14' for null setting is fixed to a crystal wedge 22 and the combination of the two crystals is held in the microscope against motion. A sliding crystal wedge 24 is provided with means (as shown in Figs. 9 and 10) for sliding the crystal to the right or left, while maintaining it in close contact with fixed wedge 22, thereby smoothly changing the apparent separation of the overlapping images through the entire range provided by the crystal wedge. Suitable indicia means are provided for indicating the position of crystal 24 relative to crystal 22 (or to the microscope), and this is also an indication of the particle size, once the indicia means are calibrated.

Fig. 8 illustrates the manner in which the arrangement of Fig. 6 may be incorporated into a practical microscope construction. A graded series of birefringent crystals 16, 17, 18, etc., are mounted on a disc 30 fixed to a shaft 31 rotatably mounted in a suitable housing 32 fixed to the microscope housing 34. A knob 36 is provided for selectively rotating the various crystals into alignment with the eye lens 12, and a pointer 38 or other suitable indicating means may be provided for indicating on a suitable scale, which may be on the top surface of housing 32, the crystal which is being used, or the indicating means may be calibrated directly in terms of particle diameters.

Fig. 9 shows a practical arrangement for incorporating the principle of Fig. 7. The sliding crystal wedge 24 of Fig. 7 is pressed against the fixed crystal 22 by means of spring 40 pressing upward on washer 42. Fixed to sliding crystal 24 is a metal bracket 44 having a vertical slot 46 through which screw 48 passes loosely. Screw 48 is threaded into back plate 50 of housing 52 so that rotation of knob 54 causes enlarge head 56 of screw 48 to press against the wedge as the screw is turned in one direction, or to pull on bracket 44 as the screw is turned in the other direction, thus moving the wedge to the right or left at will by rotation of knob 54. Suitable indicia may be provided either on the knob, or in any desired manner, to permit a direct reading of the separation of the two images.

It will be apparent that the embodiments shown are only exemplary and that various modifications can be made in construction and arrangement within the scope of my invention as defined in the appended claims.

I claim:

1. Apparatus for measuring the diameter of microscopic particles comprising a magnifying lens system for obtaining a magnified image of microscopic particles, birefringent crystal means, means for positioning said birefringent crystal means in the image beam for splitting the image beam into two simultaneous overlapping beams, said positioning means including means operatively connected therewith for varying the effective thickness of the birefringent crystal means in the image beam whereby the effective thickness of the birefringent crystal means in the image beam when the overlapping images are brought into tangency is an indication of the size of the particle.

2. Apparatus according to claim 1 wherein the birefringent crystal means includes a graded series of birefringent crystal members of varying thickness and said varying means comprises means for selectively interposing any of said crystal members in the image beam.

3. Apparatus according to claim 2 including an oppositely disposed null crystal in the image beam for obtaining a zero displacement of the beam.

4. Apparatus according to claim 1 wherein the birefringent crystal means includes a first crystal wedge and an oppositely tapered second crystal wedge both interposed in the image beam and said varying means comprises means for relatively moving said crystal wedges to vary the total thickness of crystal in the image beam.

5. Apparatus according to claim 4 including an oppositely disposed null crystal for obtaining zero displacement of the beam.

References Cited in the file of this patent

UNITED STATES PATENTS 2,494,441  Hillier _____ Jan. 10, 1950

OTHER REFERENCES

Poynting, J. H., "The Parallel Plate Micrometer," page 79 of The Proceedings of the Optical Convention, vol. No. 1, published in 1905 by Norgate & Williams, London.